US011500191B2

(12) United States Patent
Hunwardsen et al.

(10) Patent No.: US 11,500,191 B2
(45) Date of Patent: Nov. 15, 2022

(54) SPACE OPTICS

(71) Applicant: Meta Platforms, Inc., Menlo Park, CA (US)

(72) Inventors: Matthew Thomas Hunwardsen, Simi Valley, CA (US); Peter Zeman, Thousand Oaks, CA (US); Jean-Yves Tardif, Camarillo, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 518 days.

(21) Appl. No.: 16/555,219

(22) Filed: Aug. 29, 2019

(65) Prior Publication Data

US 2020/0103641 A1  Apr. 2, 2020

Related U.S. Application Data

(60) Provisional application No. 62/739,036, filed on Sep. 28, 2018.

(51) Int. Cl.
*G02B 23/02* (2006.01)
*G02B 5/08* (2006.01)
*G02B 25/00* (2006.01)
*G02B 23/16* (2006.01)
*B32B 9/00* (2006.01)
*B32B 7/12* (2006.01)

(52) U.S. Cl.
CPC .............. *G02B 23/02* (2013.01); *B32B 7/12* (2013.01); *B32B 9/007* (2013.01); *G02B 5/0841* (2013.01); *G02B 23/16* (2013.01); *G02B 25/001* (2013.01); *B32B 2305/10* (2013.01); *B32B 2363/00* (2013.01); *B32B 2551/08* (2013.01)

(58) Field of Classification Search
CPC ........ G02B 23/02; G02B 23/16; G02B 5/001; G02B 5/08; G02B 5/0841; G02B 5/0833; G02B 5/0858; G02B 5/0816; G02B 25/00; G02B 5/285; G02B 5/288; B32B 7/12; B32B 9/007; B32B 9/00; B32B 2305/10; B32B 2363/00; B32B 2551/08
USPC ....... 359/399, 584–586, 588, 589, 838, 848, 359/863, 883, 904, 214
See application file for complete search history.

(56) References Cited

U.S. PATENT DOCUMENTS

2008/0252862 A1\* 10/2008 Okura ................. H04N 5/7408
348/E5.138

OTHER PUBLICATIONS

Andrews J., et al., "Carbon Fiber Reinforced Polymer (CFRP) Optics Quality Assessment for Lightweight Deployable Optics," Proc 2010 AMOS Technical Conference, Sep. 2010, pp. 1-9.

(Continued)

*Primary Examiner* — Jie Lei
(74) *Attorney, Agent, or Firm* — Fenwick & West LLP

(57) ABSTRACT

An optical mirror assembly includes a crystalline face sheet and a carbon fiber sandwich. The crystalline face sheet has a first surface configured to reflect light and a second surface coupled to the carbon fiber sandwich by a layer of epoxy. The carbon fiber sandwich is configured to structurally support the crystalline face sheet. The carbon fiber sandwich includes a first carbon fiber layer, a second carbon fiber layer and a substrate positioned between the first carbon fiber layer and the second carbon fiber layer.

9 Claims, 5 Drawing Sheets

(56) References Cited

OTHER PUBLICATIONS

Baiocchi D., et al., "Enabling Future Space Telescopes: Mirror Technology Review and Development Roadmap," Astro2010: The Astronomy and Astrophysics Decadal Survey, Technology Development Papers, No. 23, Mar. 2009, pp. 1-11.
Chen, P., et al., "Advances in Very Lightweight Composite Mirror Technology," Optical Engineering, vol. 39, Iss. 9, Sep. 2000, pp. 2320-2329.
Utsunomiya S., et al., "CFRP Composite Mirrors for Space Telescopes and Their Microdimensional Stability," Proceedings of SPIE, San Diego U.S.A., vol. 7739, Iss. 116, Jul. 22, 2010, pp. 1-7.
Utsunomiya S., et al., "Development of CFRP Mirrors for Space Telescopes," In Material Technologies and Applications to Optics, Structures, Components, and Sub-Systems, International Society for Optics and Photonics, vol. 8837, Sep. 30, 2013, pp. 1-6.
Vukobratovich D., "Lightweight Mirror Design," Optomechanical Engineering Handbook, 1999, pp. 1-40.
Wei, L., et al., "Design and optimization of the CFRP mirror components," Photonic Sensors, vol. 7, No. 3, Mar. 31, 2017, pp. 270-277.
Yoder, P., "Opto-Mechanical Systems Design," SPIE Press, vol. 1, Fourth Ed., Mar. 19, 2015, pp. 1-182.

\* cited by examiner

SPACE OPTICS

CROSS REFERENCE TO RELATED APPLICATION

This application claims the benefit of U.S. Provisional Application No. 62/739,036, filed Sep. 28, 2018, which is incorporated by reference in its entirety.

BACKGROUND

This disclosure relates generally to space optics, and in particular to mirror architecture for space optics.

Many existing telescope configurations, such as a Newtonian Reflector telescopes, Cassegrainian telescopes, and Maksutov telescopes, use mirrors for diffracting light to allow a user to see distant objects. Although these types of telescopes are useful in space operations for data acquisition, they can be subjected to extreme environmental conditions in space. In particular, mirrors included in space telescopes may experience deformation under extreme temperatures and forces, and deformation of a mirror can negatively affect functionality of a space telescope. Materials currently implemented in mirror architecture for space telescopes, such as Beryllium, fused silica, aluminum, and silicon carbide, are often difficult to manufacture, dense, low in availability, and have long lead times. Accordingly, a mirror architecture better suited to space operation is needed.

SUMMARY

Embodiments relate to an optical mirror assembly for a space telescope. The optical mirror assembly includes a crystalline face sheet and a carbon fiber sandwich. The crystalline face sheet has a first surface configured to reflect light and a second surface coupled to the carbon fiber sandwich by a layer of epoxy. The carbon fiber sandwich is configured to structurally support the crystalline face sheet. The carbon fiber sandwich includes a first carbon fiber layer, a second carbon fiber layer, and a substrate positioned between the first carbon fiber layer and the second carbon fiber layer. The substrate may be a carbon infused foam or carbon fiber with a honey comb structure. The crystalline face sheet, the carbon fiber sandwich, and the layer of epoxy can have material properties suited to a space environment.

In some embodiments, the optical mirror assembly can be a primary mirror in a Cassegrainian telescope.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments relate to an optical mirror assembly for a space telescope that includes a crystalline face sheet and a carbon fiber sandwich. The crystalline face sheet has a first surface configured to reflect light and a second surface coupled to the carbon fiber sandwich by a layer of epoxy. The carbon fiber sandwich is configured to structurally support the crystalline face sheet. The carbon fiber sandwich includes a first carbon fiber layer and a second carbon fiber layer. A substrate is positioned between the first carbon fiber layer and the second carbon fiber layer. The substrate may be a carbon infused foam or carbon fiber with a honey comb structure.

The optical mirror assembly has a structure that allows the mirror assembly to withstand harsh conditions experienced during space exploration (e.g., extreme temperatures, high forces, etc.). Additionally, the optical mirror assembly can be composed of materials well suited to a space environment. For example, materials of the optical mirror assembly can have high thermal resistance, high strength, and high durability. The optical mirror assembly is scalable such that the optical mirror assembly can be implemented in a plurality of telescopes. Embodiments of the optical mirror assembly are described in greater detail below.

Example Telescope Configuration

Figure 1A:
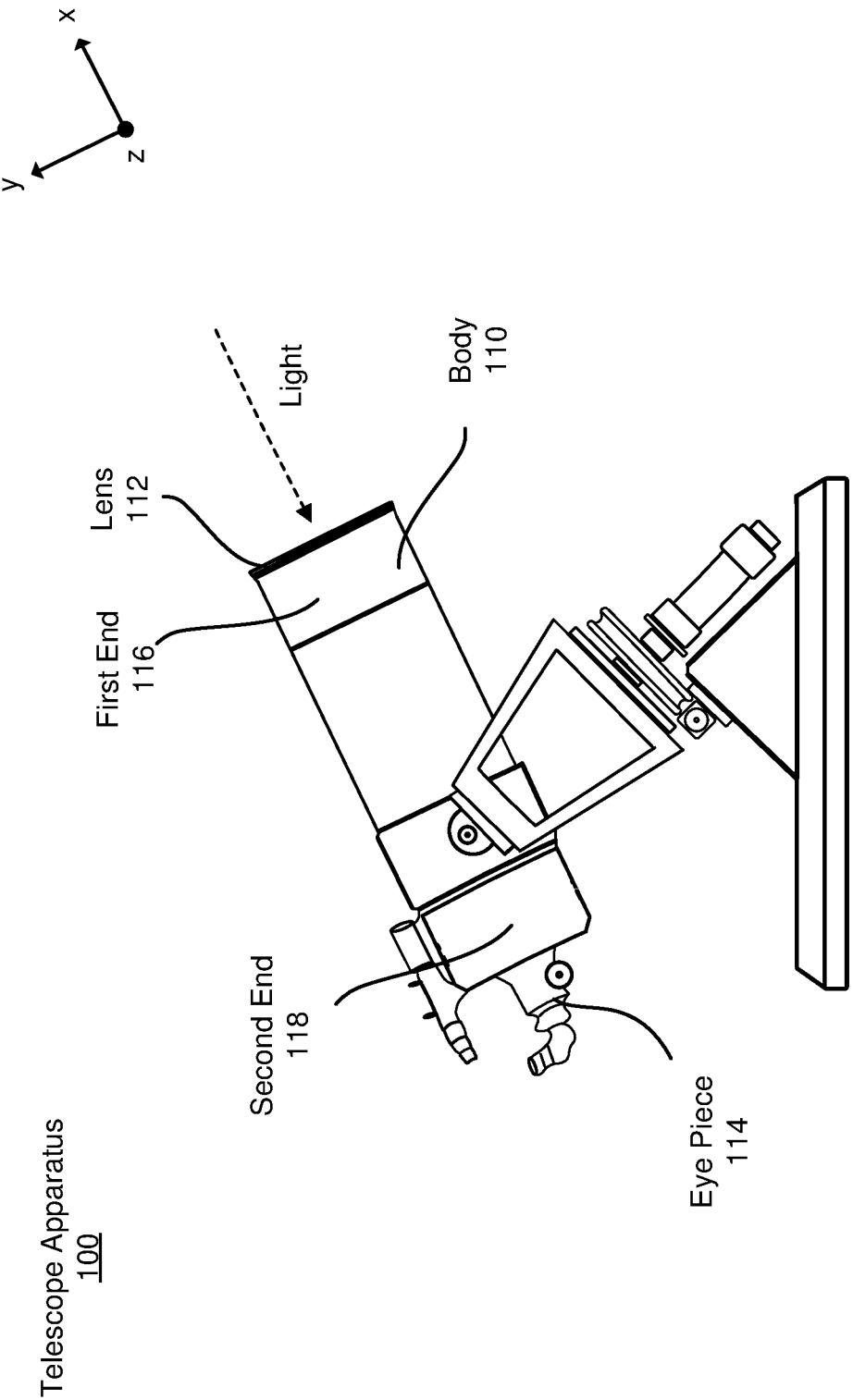
FIG. 1A illustrates a telescope apparatus, in accordance with an embodiment.

FIG. 1A illustrates a telescope apparatus, in accordance with an embodiment. The telescope apparatus 100 can be used to gather data and view distant objects. The telescope apparatus 100 can be configured to operate in space. The telescope apparatus 100 can include fewer or additional components than described herein. In one embodiment, the telescope apparatus 100 is a Cassegrainian telescope, described below in relation to FIG. 1B. In other embodiments, the telescope apparatus 100 can be any suitable type of telescope.

The telescope apparatus 100 has a hollow cylindrical body 110 with a first end 116 and a second end 118. The body 110 includes a lens 112 at the first end 116, and the body 110 is configured to receive light via the lens 112. The lens 112 may be composed of a translucent material (e.g., glass). The telescope body 110 includes an eye piece 114 at the second end 118. A user can look through the eye piece 114 to view information received via the lens 112. In other embodiments, the telescope apparatus 100 includes a sensor (e.g., a camera) in addition to or instead of the eyepiece 114 to capture information received by the telescope apparatus 100.

Figure 1B:
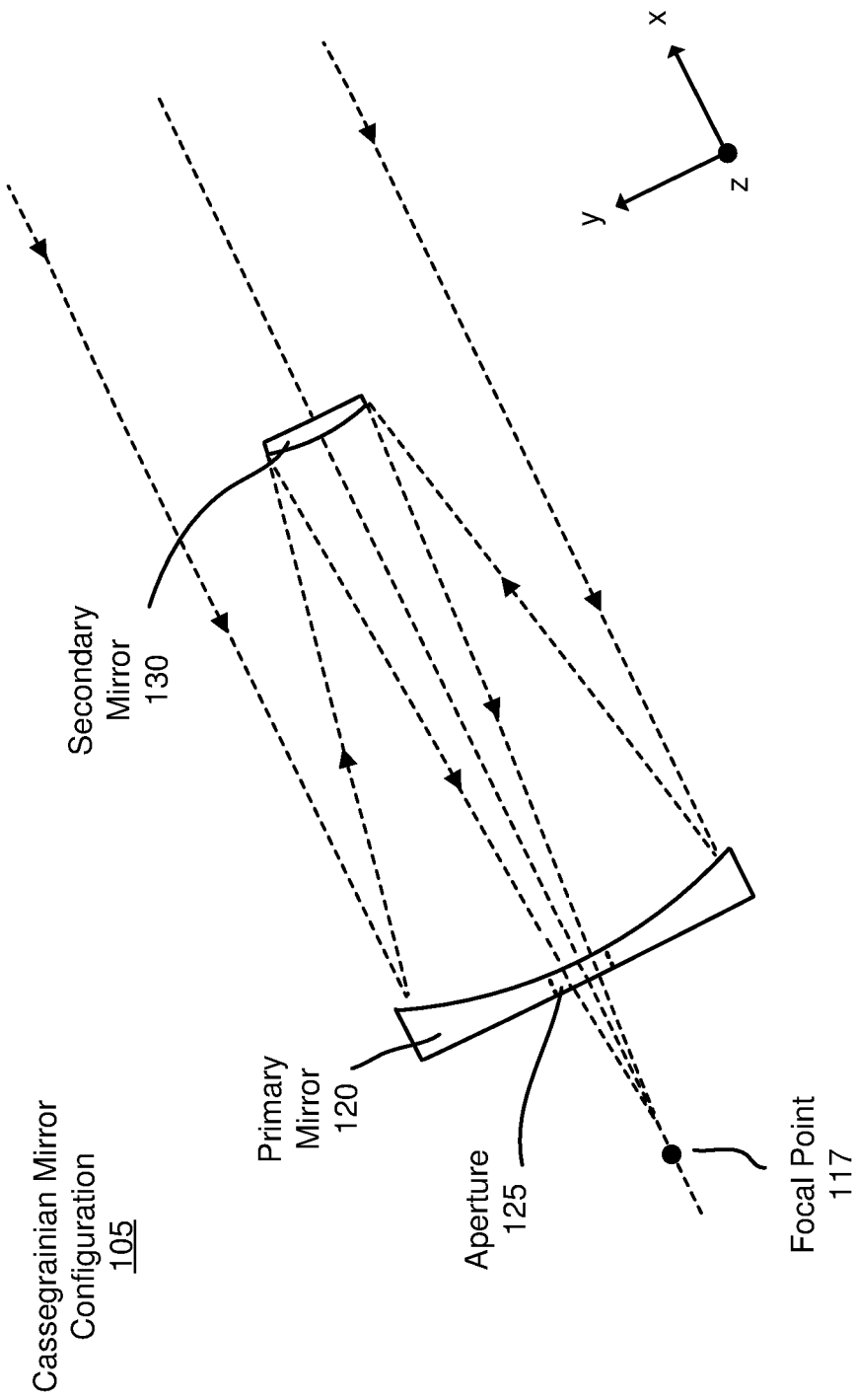
FIG. 1B illustrates a Cassegrainian mirror assembly included in the telescope apparatus of FIG. 1A, in accordance with an embodiment.

As described above, in one embodiment the telescope apparatus 100 shown in FIG. 1A is a Cassegrainian telescope. FIG. 1B illustrates a Cassegrainian mirror configuration 105, in accordance with an embodiment. The Cassegrainian mirror configuration 105 may include, among other components, a primary mirror 120 and a secondary mirror 130. As shown in FIG. 1B, the primary mirror 120 is a concave mirror configured to reflect light to the secondary mirror 130. The secondary mirror 130 may be a convex mirror configured to reflect light reflected by the primary mirror 120 to a focal point 117. The primary mirror 120 is formed with an aperture 125 such that light reflected by the secondary mirror 130 passes through the aperture 125 to the focal point 117. The arrows shown in FIG. 1B illustrate the direction of light reflected by the primary mirror 120 and the secondary mirror 130. In one embodiment, the reflected light converges at the focal point 117. The focal point 117 may be a viewpoint seen by a user. In other embodiments, a sensor (e.g., camera) can be positioned at the focal point 117 to capture images or video from the perspective of the focal point 117.

The Cassegrainian mirror configuration 105 can be positioned within the body 110 of the telescope apparatus 100. The primary mirror 120 is positioned at the second end 118 of the telescope apparatus 100. In one embodiment, the primary mirror 120 is coupled to an internal surface of the body 110 at the second end 118. The secondary mirror 130 is positioned between the first end 116 and the second end 118. The center of the primary mirror 120 and the center of the secondary mirror 130 are approximately aligned with a central axis of the telescope body 110 (e.g., along an axis parallel to the x-axis). In some embodiments, the primary mirror 120 has a diameter approximately equal to the inner diameter of the telescope body 110. Alternatively, the primary mirror 120 can have a diameter smaller than the diameter of the body 110. The secondary mirror 130 has a diameter smaller than the diameter of the primary mirror 120.

In one embodiment, the telescope apparatus 100 is a space telescope. As such, components of the telescope apparatus 100 may have unique design considerations (e.g., weight, strength, thermal resistance) for operation in a space environment. In particular, the primary mirror 120 can have a structure suited to space operation, described in greater detail below in relation to FIGS. 2A through 4.

Primary Mirror Configuration

Figure 2A:
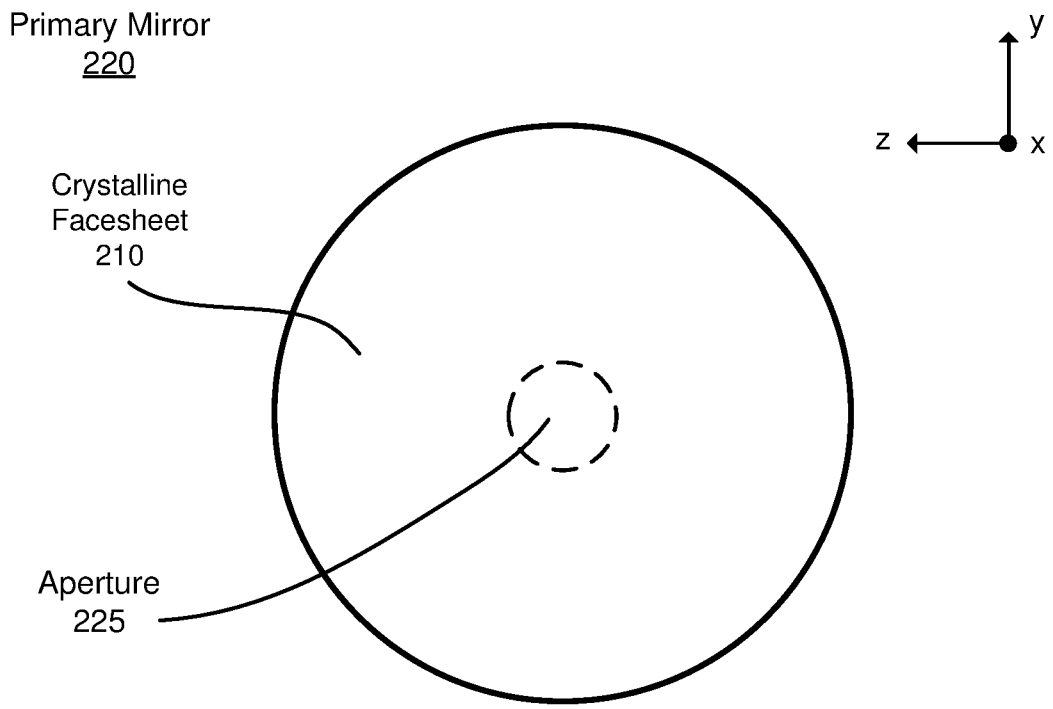
FIG. 2A illustrates a top view of a primary mirror, in accordance with an embodiment.

FIG. 2A illustrates a top view of a primary mirror 220, in accordance with an embodiment. The primary mirror 220 may be included in a Cassegrainian telescope (e.g., as shown in FIGS. 1A-1B). The primary mirror 220 can include fewer or greater components than described herein. Additionally, the primary mirror 220 may have a different structure than described below.

In the embodiment of FIG. 2A, the primary mirror 220 includes a crystalline face sheet 210 with at least one surface configured to reflect light. In other embodiments, the primary mirror 220 can include a surface composed of a different reflective material (e.g., aluminum, glass, etc.). The reflective surface of the crystalline face sheet 210 shown in FIG. 2A is concave. In other embodiments, the crystalline face sheet 210 can have a convex or flat reflective surface. The crystalline face sheet 210 may be formed with an aperture 225 such that light (e.g., light reflected by the secondary mirror 130) can pass through the aperture 225. The diameter of the aperture 225 may be smaller than the diameter of the secondary mirror 130. In some embodiments, the crystalline face sheet 210 is pre-formed close to its final dimensions and shape. Pre-forming the crystalline face sheet 210 may minimize the intrinsic stress of the primary mirror 220. Additionally, the crystalline face sheet 210 can have a surface finish or treatment configured to reflect light. The crystalline face sheet 210 may have a high hardness and a relatively low coefficient of thermal expansion (CTE). In some embodiments, the crystalline face sheet 210 may have a CTE substantially the same as carbon fiber. The crystalline face sheet 210 may have a high tensile strength and high Young's Modulus. The crystalline face sheet 210 may be composed of single crystal silicon, silicon carbide, or some combination thereof.

In some embodiments, the primary mirror 220 may be exposed to harsh conditions (e.g., extreme temperatures, large forces). As such, the primary mirror 220 can include a support structure configured to minimize deformation of the crystalline face sheet 210 under these conditions.

Figure 2B:
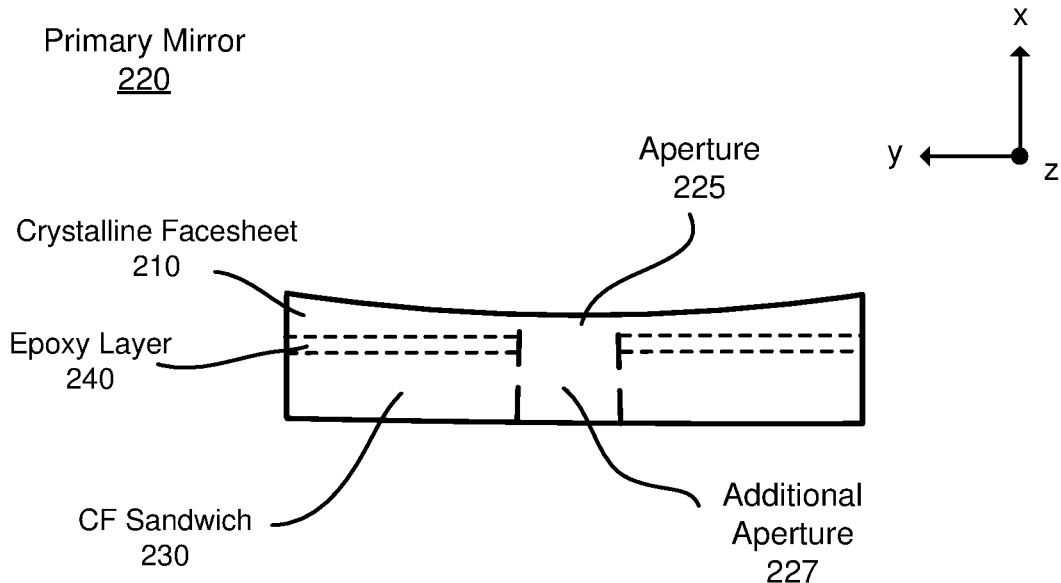
FIG. 2B illustrates a side view of the primary mirror shown in FIG. 2A, in accordance with an embodiment.

The primary mirror 220 includes a CF sandwich 230 that provides structural support to the crystalline face sheet 210 and reduces deformation of the crystalline face sheet 210. As shown in FIG. 2B, the CF sandwich 230 can have a cylindrical body with a diameter approximately equal to the diameter of the crystalline face sheet 210. The CF sandwich 230 can also be formed with an additional aperture 227 that aligns with the aperture 225 of the crystalline face sheet 210 such that light can pass through the primary mirror 220. In other embodiments, the CF sandwich can be any suitable shape and/or size for supporting the crystalline face sheet 210. The CF sandwich 230 includes at least one layer of carbon fiber. Generally, carbon fiber has a high strength and low density. In one embodiment, the CF sandwich 230 has a CTE between −1 and 3 parts per million per degree Celsius (ppm/C). The CF sandwich 230 can have any other properties suited to supporting the primary mirror 220. Embodiments of the CF sandwich 230 are described in greater detail below in relation to FIGS. 3 and 4.

In one embodiment, the crystalline face sheet 210 and the CF sandwich 230 have different CTEs. Even a slight difference in CTEs between the crystalline face sheet 210 and the CF sandwich 230 can increase the dependency of the surface figure error on temperature for the crystalline face sheet 210. Surface figure error is the deviation of the crystalline face sheet 210 from its perfect form. An increase in surface figure error can affect the reflective properties of the crystalline face sheet 210, affecting operation of the telescope (e.g., telescope apparatus 100). Thus, in the embodiment of FIG. 2B, the CF sandwich 230 is coupled to the crystalline face sheet 210 by a layer of epoxy 240. The epoxy layer 240 is configured to provide an elastic interface between the crystalline face sheet 210 and the CF sandwich 230. In particular, the epoxy layer 240 may have properties that compensate for the difference in CTEs between the CF sandwich 230 and the crystalline face sheet 210. For example, the epoxy layer 240 may have elastic properties over a broad temperature range, allowing the CF sandwich 230 to provide structural support to the crystalline face sheet 210 while minimizing surface figure error of the crystalline face sheet 210.

In one embodiment, the layer of epoxy 240 has a thickness between 50 and 2000 micrometers. Additionally, the epoxy 240 can have a CTE of 9 to 250 parts per million per degree Kelvin (ppm/K) and a Young's Modulus of 3 to 10,000 Mega Pascals (MPa). In other embodiments, the epoxy layer 240 can have any suitable properties for coupling the CF sandwich 230 to the crystalline face sheet 210. Furthermore, the epoxy 240 can have a unique cure schedule such that the epoxy 240 maintains properties (e.g., elasticity) well suited to a space environment. In one embodiment, the epoxy 240 is cured beginning with a long (e.g., between 12-120 hours), low temperature cure period. After the initial curing, the strength and stiffness of the epoxy 240 may be at least 90% of its final strength and stiffness. The second curing period may be a shorter (e.g., 1-8 hours), high temperature curing period that brings the epoxy 240 near its asymptotic maximum for final strength and structural stiffness. Additionally, the epoxy's 240 glass transition temperature may be driven beyond its maximum operational and storage temperature during the second cure period. Curing the epoxy 240 in this manner allows the epoxy 240 to couple the crystalline face sheet 210 and the CF sandwich 230.

Figure 2C:
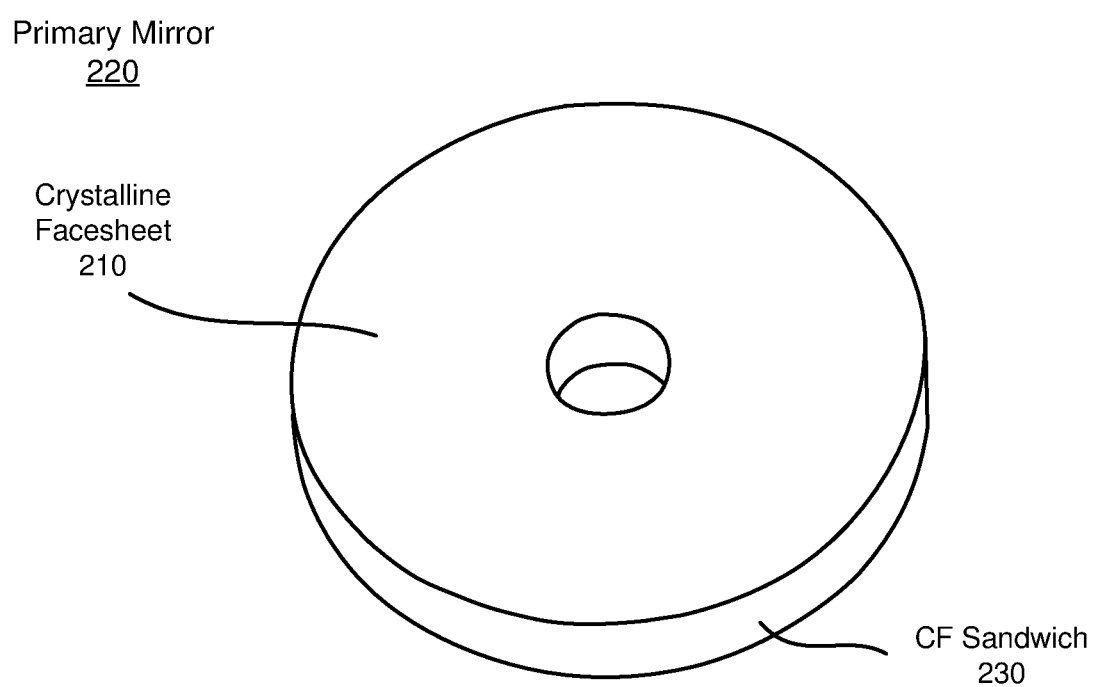
FIG. 2C illustrates a perspective view of the primary mirror shown in FIG. 2A, in accordance with an embodiment.

FIG. 2C illustrates an isometric view of the primary mirror 220 shown in FIG. 2A. The primary mirror 220 has a cylindrical body with a concave reflective surface, the crystalline face sheet 210. The cylindrical body includes the CF sandwich 230. In other embodiments, the primary mirror 220 can have another shape suited to the telescope apparatus 100.

CF Sandwich Configuration

The CF sandwich 230 described above in relation to FIG. 2B includes at least one layer of carbon fiber. The CF sandwich 230 can additionally include other materials or other carbon infused materials. Example embodiments of a primary mirror including different CF sandwich configurations are shown in FIGS. 3-4 and described in greater detail below.

Figure 3:
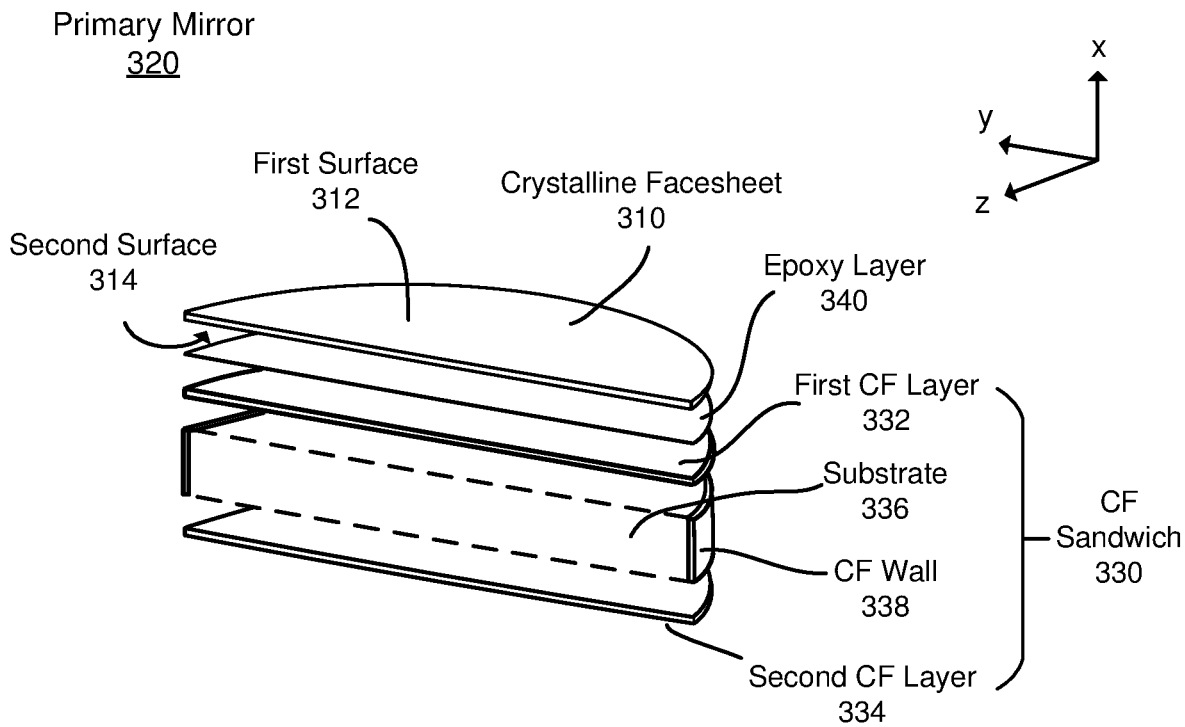
FIG. 3 illustrates a cross sectional view of a primary mirror, in accordance with an embodiment.
Figure 4:
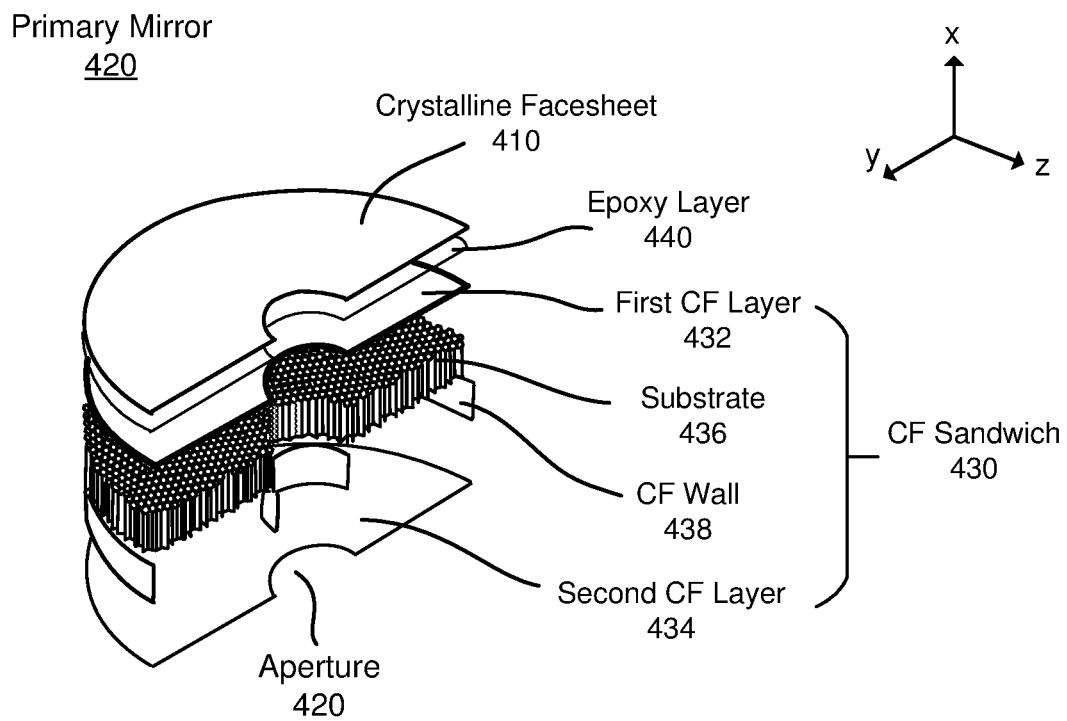
FIG. 4 illustrates a cross sectional view of a primary mirror, in accordance with another embodiment.

FIG. 3 illustrates an embodiment of a primary mirror 320 including a first configuration of a CF sandwich, in accordance with an embodiment. The primary mirror 320 is substantially the same as primary mirror 220. The primary mirror 320 includes a crystalline face sheet 310 substantially the same as crystalline face sheet 210 and an epoxy layer 340 substantially the same as epoxy layer 240.

A first surface 312 of the crystalline face sheet 310 is configured to reflect light. A second surface 314 of the crystalline face sheet 310 opposing the first surface 312 is configured to interface with the CF sandwich 330. The second surface 314 can have a surface finish to promote adhesion between the second surface 314 and the CF sandwich 330. For example, the surface finish may be a treatment, preparation or other material characteristic (e.g., primer, roughness, etc.). The second surface 314 is coupled to the CF sandwich 330 by the epoxy layer 340. Although not shown in FIG. 3, the crystalline face sheet 310 and the CF sandwich 330 can each be formed with an aperture (e.g., aperture 225, another aperture 227), as described above.

In the embodiment of FIG. 3, the CF sandwich 330 may include, among other components, a first CF layer 332 and a second CF layer 334. The first CF layer 332 and the second CF layer 334 can each have a thickness between 50 and 250 micrometers. In other embodiment, the CF layers 332 and 334 can have any suitable thickness. The CF sandwich 330 can additionally have a CF wall 338 coupled to the first CF layer 332 and/or the second CF layer 334. The CF wall 338 may be perpendicular to the CF layers 332 and 334. The CF wall 338 can be positioned around the perimeter of the first CF layer 332 and the second CF layer 334.

The carbon fiber material in the CF sandwich 330 (i.e. material used for the first CF layer 332, second CF layer 334, and CF wall 338) can have a CTE of −1.5 to 2.5 parts per million per Kelvin (ppm/K). The density of the carbon fiber is approximately 1.5 to 5.0 gram per cubic centimeter. Additionally, the carbon fiber can have a Young's Modulus between 100 and 500 Giga Pascals (GPa). In alternative embodiments, the carbon fiber can have any suitable properties for providing structural support to the primary mirror 320.

In the embodiment of FIG. 3, the CF sandwich 330 includes a substrate 336 between the first carbon fiber layer 332 and the second carbon fiber layer 334. In one embodiment, the substrate 336 is a carbon infused foam. The carbon infused foam may be lightweight yet strong, such that the substrate 336 provides structural support to the primary mirror 120. In other embodiments, the substrate 336 may be another lightweight and/or strong material, as discussed below in relation to FIG. 4. The substrate 336 may have a CTE substantially the same as the CTE of the carbon fiber material in the CF sandwich 330 to prevent structural deformation of the CF sandwich 330.

FIG. 4 illustrates a primary mirror 420 including a second configuration of a CF sandwich, in accordance with an embodiment. The primary mirror 420 is substantially the same as primary mirrors 220 and 320. The primary mirror 420 includes a crystalline face sheet 410 substantially the same as crystalline face sheets 210 and 310. The epoxy layer 440 is substantially the same as epoxy layers 240 and 340.

In the embodiment of FIG. 4, the CF sandwich 430 includes a first CF layer 432 coupled to a second CF layer 434. The first CF layer 432 and the second CF layer 434 are substantially the same as the first CF layer 332 and the second CF layer 334. The CF sandwich 430 also includes a CF wall 438 substantially the same as the CF wall 338.

In the embodiment of FIG. 4, the CF sandwich 430 includes a substrate 436 with a honey comb structure. The honey comb structure is oriented perpendicular to the first CF layer 432 and the second CF layer 434. The honey comb structure may be composed of a carbon fiber material. The honey comb structure allows for a low density, high strength substrate 436 for supporting the primary mirror 420. In other embodiments, the honey comb structure can be composed of any suitable material.

Embodiments of the mirror configuration described above (e.g., primary mirror 220, 320, 420) can be included in many different telescopes. In a specific embodiment, the primary mirror described above is included in a space telescope. The primary mirror is scalable such that it can be included in telescopes with variety of sizes. Additionally, the architecture of the primary mirror can be used in other optic systems (e.g., instruments for collecting data in space). The mirror configuration can improve manufacturability, weight and complexity of current optic systems designed for space exploration. In some embodiments, the mirror configuration can be used for purposes beyond a telescope that require a large mirror. For example, the mirror configuration may be used in coarse pointing assemblies (CPA) such as instruments directed to heliostat configurations and/or coelestat configurations, as well as free space laser communication systems.

The foregoing description of the embodiments has been presented for the purpose of illustration; it is not intended to be exhaustive or to limit the patent rights to the precise forms disclosed.

The invention claimed is:

1. An optical mirror assembly comprising:
   a crystalline face sheet comprising a first surface and a second surface opposing the first surface, the first surface configured to reflect light, the crystalline face sheet having a first coefficient of thermal expansion; and
   a carbon fiber sandwich comprising:
     a first carbon fiber layer coupled to the second surface of the crystalline face sheet,
     a layer of epoxy between the first carbon fiber layer and the crystalline face sheet, the layer of epoxy having a thickness of 50 to 2000 micrometers and a second coefficient of thermal expansion of 9 to 250 parts million per degree Kelvin to compensate for a difference in expansion due to the first coefficient of thermal expansion and the second coefficient of thermal expansion,
     a second carbon fiber layer, the first carbon fiber layer and the second carbon fiber layer having a coefficient of thermal expansion between −1.5 and 2.5 parts per million per degree Kelvin, a substrate between the first carbon fiber layer and the second carbon fiber layer, and a carbon fiber wall around a perimeter of the substrate, and coupled to at least one of the first carbon fiber layer and the second carbon fiber layer.

2. The optical mirror assembly of claim 1, wherein the substrate is a carbon infused foam.

3. The optical mirror assembly of claim 1, wherein the substrate is carbon fiber with a honey comb shape.

4. The optical mirror assembly of claim 1, wherein the crystalline face sheet is formed with an aperture and the carbon fiber sandwich is formed with another aperture aligned with the aperture.

5. The optical mirror assembly of claim 1, wherein the first carbon fiber layer and the second carbon fiber layer each have a thickness of 50 to 250 micrometers.

6. The optical mirror assembly of claim 1, wherein the crystalline face sheet is a concave mirror.

7. The optical mirror assembly of claim 1, wherein the layer of epoxy has a Young's Modulus of 3 to 10,000 Mega Pascals.

8. The optical mirror assembly of claim 1, wherein the first carbon fiber layer and the second carbon fiber layer have a Young's Modulus of 100 to 500 Giga Pascals.

9. The optical mirror assembly of claim 1, wherein optical mirror assembly is a primary mirror in a Cassegrainian telescope.

\* \* \* \* \*